(12) United States Patent
Torres et al.

(10) Patent No.: US 11,036,728 B2
(45) Date of Patent: *Jun. 15, 2021

(54) NATURAL LANGUAGE-AIDED CONVERSATIONAL EXPLORATION OF SELF-DOCUMENTING APPLICATION PROGRAMMING INTERFACES

(71) Applicant: International Business Machines Corporation, Armonk, NY (US)

(72) Inventors: Isa M. Torres, Poughkeepsie, NY (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,966

(22) Filed: Aug. 6, 2019

(65) Prior Publication Data

US 2021/0019307 A1 Jan. 21, 2021

Related U.S. Application Data

(63) Continuation of application No. 16/514,792, filed on Jul. 17, 2019.

(51) Int. Cl.
*G06F 9/54* (2006.01)
*G06F 16/242* (2019.01)
(Continued)

(52) U.S. Cl.
CPC ...... *G06F 16/243* (2019.01); *G06F 16/24522* (2019.01); *G06F 16/24578* (2019.01); *G06F 16/252* (2019.01); *G06F 40/40* (2020.01)

(58) Field of Classification Search
CPC .............. G06F 8/20; G06F 8/30; G06F 9/541
(Continued)

(56) References Cited

U.S. PATENT DOCUMENTS

| 9,015,730 B1 | 4/2015 | Allen et al. |
| 9,092,276 B2 | 7/2015 | Allen et al. |

(Continued)

FOREIGN PATENT DOCUMENTS

WO 2018200135 A1 11/2018

OTHER PUBLICATIONS

ECMA; "Standard ECMA-404: The JSON data interchange syntax"; second edition, Dec. 2017.
(Continued)

*Primary Examiner* — Andy Ho
(74) *Attorney, Agent, or Firm* — Alexander G. Jochym (57) ABSTRACT

Intent-based exploring of self-documenting Application Programming Interface ("API") documents comprises receiving a document containing a plurality of descriptions of APIs, wherein the document is in a structured format; generating a plurality of entities by identifying a plurality of API definition entries in the document; generating a plurality of intents by iterating through a plurality of path entries in the document; generating a dialog by creating a plurality of phrases by iterating through the plurality of path entries in the document; receiving one or more questions from a user or developer; and in response to the one or more questions, providing one or more conversational responses to the user by a conversational application program incorporating the plurality of entities, plurality of intents, and plurality of phrases.

6 Claims, 11 Drawing Sheets

(51) Int. Cl.
*G06F 16/2457* (2019.01)
*G06F 16/25* (2019.01)
*G06F 16/2452* (2019.01)
*G06F 40/40* (2020.01)

(58) Field of Classification Search
USPC .................................. 717/100, 106; 179/328
See application file for complete search history.

(56) References Cited

U.S. PATENT DOCUMENTS

| | | | |
|---|---|---|---|
| 9,606,990 B2 | 3/2017 | Allen et al. | |
| 10,725,836 B2* | 7/2020 | Savenkov | G06F 8/36 |
| 2012/0296929 A1 | 11/2012 | Hossain et al. | |
| 2015/0169385 A1 | 6/2015 | Allen et al. | |
| 2016/0283360 A1 | 9/2016 | Allen et al. | |
| 2019/0066694 A1 | 2/2019 | Hirzel et al. | |
| 2020/0074374 A1* | 3/2020 | Perryman | G06Q 10/06393 |
| 2020/0192976 A1* | 6/2020 | Swamypillai | G06F 40/284 |

OTHER PUBLICATIONS

Android Developer; definition of "intent", retrieved on Jun. 19, 2019 from https://developer.android.com/reference/android/content/Intent.

Github; "OpenAPI Specification (fka Swagger RESTful API Documentation Specification)", Apr. 4, 2017.

Github; "1. What is Swagger?"; retrieved Jun. 19, 2019 from https://mjstealey.github.io.

Homa; "Intent-based RESTful APIs", Sep. 17, 2018. https://blog.ecitele.com.

Istio; "What is Istio?"; retrieved on Jun. 19, 2019 from https://istio.io.

jboss.org; "Chapter 13. Generate a CRUD Database Application", retrieved on Jun. 19, 2019 from https://docs.jboss.org.

json.org; Introducing JSON, retrieved on Jun. 17, 2019 from https://www.json.org.

Stackoverflow; "Converting Swagger specification JSON to HTML documentation", retrieved on Jun. 21, 2019 from https://stackoverflow.com.

swagger.io; "What is Swagger?", retrieved on Jun. 17, 2019 from https://swagger.io.

swagger.io; "How do I get started with Swagger?", retrieved on Jun. 17, 2019 from https://swagger.io.

techtarget.com; "REST (REpresentational State Transfer)"; retrieved on Jun. 17, 2019 from https://techtarget.com.

yaml.org; "%YAML 1.2—YAML: YAML Ain't Markup Language", retrieved on Jun. 17, 2019 from https://yaml.org.

yaml.org; "YAML Ain't Markup Language (YAML) Version 1.2", retrieved on Jun. 17, 2019 from https://yaml.org.

IBM; "List of IBM Patents or Patent Applications Treated as Related", Aug. 6, 2019.

* cited by examiner

| Definition entry | Entity | Entity Value | Entity Pattern | Entity Definition Intent |
|---|---|---|---|---|
| `"Pet": {`<br>`  "type": "object",`<br>`  "required": [`<br>`    "name",`<br>`    "photoUrls"`<br>`  ],`<br>`  "properties": {`<br>`    "id": {`<br>`      "type": "integer",`<br>`      "format": "int64"`<br>`    },`<br>`    "category": {`<br>`      "$ref": "#/definitions/Category"`<br>`    },`<br>`    "name": {`<br>`      "type": "string",`<br>`      "example": "doggie"`<br>`    },`<br>`    "photoUrls": {`<br>`      "type": "array",`<br>`      "xml": {`<br>`        "name": "photoUrl",`<br>`        "wrapped": true`<br>`      },`<br>`      "items": {`<br>`        "type": "string"`<br>`      }`<br>`    },`<br>`    "tags": {`<br>`      "type": "array",`<br>`      "xml": {`<br>`        "name": "tag",`<br>`        "wrapped": true`<br>`      },`<br>`      "items": {`<br>`        "$ref": "#/definitions/Tag"`<br>`      }`<br>`    },`<br>`    "status": {`<br>`      "type": "string",`<br>`      "description": "pet status in the store",`<br>`      "enum": [`<br>`        "available",`<br>`        "pending",`<br>`        "sold"`<br>`      ]`<br>`    }`<br>`  },`<br>`  "xml": {`<br>`    "name": "Pet"`<br>`  }`<br>`},` | @Pet | Pet | `{`<br>`  "id": {.},`<br>`  "category": {.},`<br>`  "name": {.},`<br><br>`  "photoUrls": {.},`<br>`  "tags": {.},`<br>`  "status": {.}`<br>`}` | #definePet<br>1. Define Pet<br>2. Pet structure<br>3. Pet object |

| Path | Intent Examples | Intents |
|---|---|---|
| "/pet/{petId}": {<br>  "get": {<br>    "tags": [<br>      "pet"<br>    ],<br>    "summary": "Find pet by ID",<br>    "description": "Returns a single pet",<br>    "operationId": "getPetById",<br>    "produces": [<br>      ...<br>    ],<br>    "parameters": [<br>      {<br>        "name": "petId",<br>        "in": "path",<br>        "description": "ID of pet to return",<br>        "required": true,<br>        "type": "integer",<br>        "format": "int64"<br>      }<br>    ],<br>    "responses": {<br>      ...<br>    },<br>    ...<br>  } | List pets by petId Return pets by petId Show pets by petId Display pets by petId Get pets by petId See pets by petId Find pets by petId List pet by ID Return pet by ID Show pet by ID Display pet by ID Get pet by ID See pet by ID Find pet by ID | #getPetById |
| | What is the api to List pets by petId? What is the api to Return pets by petId? What is the api to Show pets by petId? What is the api to Display pets by petId? What is the api to Get pets by petId? What is the api to See pets by petId? What is the api to Find pets by petId? What is the api to List pet by ID? What is the api to Return pet by ID? What is the api to Show pet by ID? What is the api to Display pet by ID? What is the api to Get pet by ID? What is the api to See pet by ID? What is the api to Find pet by ID? | #explore_getPetById |

| Path | Condition | Response |
|---|---|---|
| "/pet/{petId}": {<br>  "get": {<br>    "tags": [<br>      "pet"<br>    ],<br>    "summary": "Find pet by ID",<br>    "description": "Returns a single pet",<br>    "operationId": "getPetById",<br>    "produces": [<br>      ...<br>    ],<br>    "parameters": [<br>      {<br>        "name": "petId",<br>        "in": "path",<br>        "description": "ID of pet to return",<br>        "required": true,<br>        "type": "integer",<br>        "format": "int64"<br>      }<br>    ],<br>    "responses": {<br>      ...<br>    },<br>    ...<br>  } | #explore_getPetById | GET /pet/{petId} |
| ^^^(see above) | #getPetById | (Response of API call) |

| Method | API Operation | Generated Example Set |
|---|---|---|
| Based on Method, Path, and Parameters of the API | Method: GET<br>Summary: (empty)<br>Parameters: petId<br>Path: /pets/{petId} | List pets by petId<br>Return pets by petId<br>Show pets by petId<br>Display pets by petId<br>Get pets by petId<br>See pets by petId<br>Find pets by petId |
| Based on API Summary | Method: GET<br>Summary: "Find pet by ID"<br>Parameters: petId<br>Path: /pets/{petId} | List pet by ID<br>Return pet by ID<br>Show pet by ID<br>Display pet by ID<br>Get pet by ID<br>See pet by ID<br>Find pet by ID |

| Method | API Operation | Generated Example Set |
|---|---|---|
| Based on Method, Path, and Parameters of the API | Method: POST<br>Summary: (empty)<br>Parameters: (none)<br>Path: /pet<br>Body: (reference to Pet definition) | Add Pet<br>Create Pet |
| Based on API Summary | Method: POST<br>Summary: "Add a new pet to the store"<br>Parameters: (none)<br>Path: /pet<br>Body: (reference to Pet definition) | Add a new pet to the store<br>Create a new pet to the store |
| Based on Method, Path, and Parameters of the API | Method: PUT Summary: (empty) Parameters: (none)<br>Path: /pet<br>Body: (reference to Pet definition) | Update Pet<br>Change Pet |
| Based on API Summary | Method: PUT<br>Summary: "Update an existing pet"<br>Parameters: (none)<br>Path: /pet<br>Body: (reference to Pet definition) | Update an existing pet<br>Change an existing pet |
| Based on Method, Path, and Parameters of the API | Method: DELETE<br>Summary: (empty)<br>Parameters: petId Path: /pet | Delete pet by petId Remove pet by petId Drop pet by petId Erase pet by petId |
| Based on API Summary | Method: DELETE Summary: "Deletes a pet" Parameters: petId<br>Path: /pet | Delete a pet<br>Remove a pet<br>Drop a pet Erase a pet |

| Method | API Operation | Generated Example Set |
|---|---|---|
| Based on Method, Path, and Parameters of the API | Method: POST<br>Summary: (empty)<br>Parameters: (none)<br>Path: /pet<br>Body: (reference to Order definition) | Add Order<br>Create Order |
| Based on API Summary | Method: POST<br>Summary: "Place an order for a pet"<br>Parameters: (none)<br>Path: /pet<br>Body: (reference to Order definition) | Place an order for a pet |

Fig.11

NATURAL LANGUAGE-AIDED CONVERSATIONAL EXPLORATION OF SELF-DOCUMENTING APPLICATION PROGRAMMING INTERFACES

BACKGROUND

This invention relates generally to methods and systems for assisting users in finding, using and consuming application services, especially in a stateless server-client computing arrangement.

REpresentational State Transfer ("RESTful") application programming interfaces ("APIs") have become the current de facto standard for consuming and integrating application services which are provided by one or more application server computers ("servers"), such as web services, on-demand services, etc. Discovering and exploring these application services via a self-documenting API, such as OpenAPI, formerly known as the Swagger specification, has become a widely adopted convention, and, in most cases, a presumption for developing any new application program ("application"). Tools such as Swagger Editors and Swagger Browsers are used by application program developers to discover and explore the application services available through such APIs.

Using self-documenting APIs, such as Swagger, services can be discovered, and a data-interchange format document, such as a JavaScript Object Notation ("JSON") document, can be generated based on the explorer's findings. Such as JSON object can then used to generate a well-known Swagger Interface providing documentation and API testing capabilities with input validation.

SUMMARY OF THE SEVERAL DISCLOSED EMBODIMENTS ACCORDING TO THE INVENTION

Intent-based exploring a self-documenting Application Programming Interface ("API") document is enabled by receiving a document containing a plurality of descriptions of APIs, wherein the document is in a structured format; generating a plurality of entities by identifying a plurality of API definition entries in the document; generating a plurality of intents by iterating through a plurality of path entries in the document; generating a dialog by creating a plurality of phrases by iterating through the plurality of path entries in the document; receiving one or more questions from a user or developer; and in response to the one or more questions, providing one or more conversational responses to the user by a conversational application program incorporating the plurality of entities, plurality of intents, and plurality of phrases; thereby improving efficiency of a user interface for a software developer tool to find suitable APIs, and improving efficiency of a runtime computing environment by improving the selection of APIs which consume minimal appropriate computing and communications resources.

DETAILED DESCRIPTION OF EMBODIMENT(S) OF THE INVENTION

The present inventors have recognized an unsolved problem in the aforementioned arts, practices, and tool sets in that, during a developer's browsing of available self-documenting APIs such as Swagger and OpenAPI APIs, the Swagger document becomes larger and larger, and the Swagger page longer. When using an API gateway or aggregator, such as Istio™, a developer can obtain a very large list of APIs to peruse.

Eventually, the Swagger document can become troublesome to navigate and locate particular APIs. One common practice to navigate these APIs is to do a page search (e.g., Ctrl+F), but the present inventors have realized that this technique only covers what is shown in the page, e.g., extended nodes and titles. The current API discovery process can be challenging especially for a new or inexperienced API consumer, who could be a user interface (UI) developer or a software developer looking at integrating with these services, for example, and it forces a full ingestion to get a good understanding of the information being provided.

Figure 1:
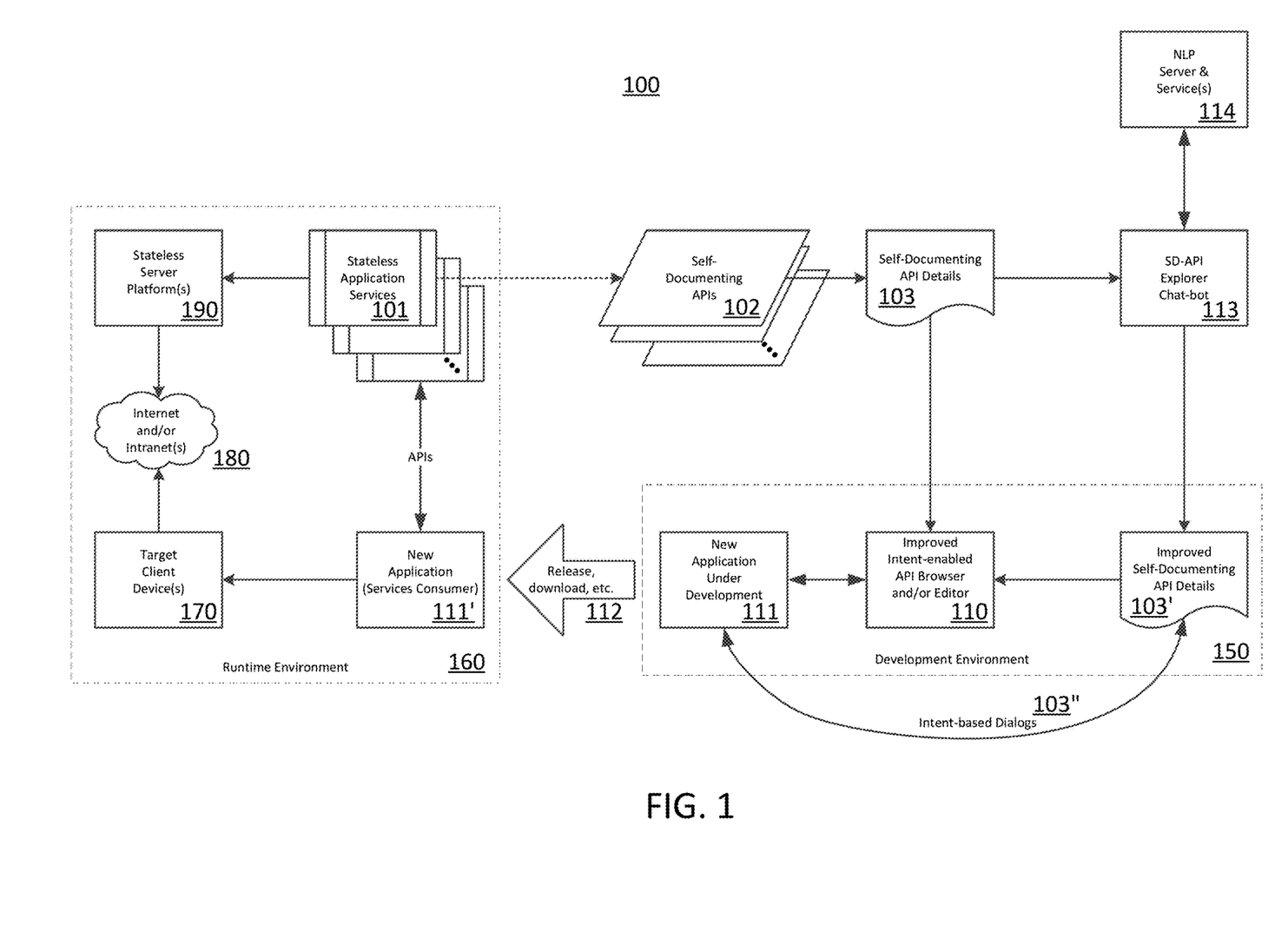
FIG. 1 depicts an exemplary arrangement of computers, digital communications facilities, and computer-based services and tools as improved according to at least one embodiment of the present invention.

Referring now to FIG. 1, an exemplary arrangement 100 of computers, digital communications facilities, and computer-based services and tools is shown as improved according to at least one embodiment of the present invention. When a software developer is working in a development environment 150, he or she may use a specialized tool 110 to browse or explore a great number of available APIs 102 to pre-existing application services 101 which may be co-opted and used by the new program 111 which is under development by the software developer. The aforementioned stateless application services may provide self-documenting API's 120, such as Swagger and OpenAPI APIs, which are accessed by a browsing or exploring tool 110, such as a Swagger editor.

The ultimate goal is to create a new executable application 111' which is released into a runtime environment 160, whereupon during execution, a target client device or devices 170 executing the new application 111' may consume the stateless application services 101, such as RESTful services, wherein the co-opted and consumed services are executed by a stateless server computer platform 190, and the API communications (data exchange) typically occurs over one or more intranets and/or the Internet 180.

As previously discussed in the previous paragraphs, due to the great number of available and discoverable OpenAPI-compliant RESTful application services, eventually, the Swagger document created during the developer's exploration efforts can become troublesome to navigate and locate particular APIs because of its size and limited information (i.e., limited to only what is shown in the page, including just extended nodes and titles). So, the current API discovery process for developers can be challenging, especially for a new or inexperienced API consumer. While the availability of such a great number of consumable application services reduces new application development time, the time savings can be offset by the time spent exploring and finding just the right application services to use, and how to use them via their different APIs.

The present inventors have therefore determined that the direct browsing process of many, many API's is no longer as productive as it once was when fewer APIs were available, and that the limited information provided by the self-documenting API's further hinders quickly and efficiently finding just the right application services to consume for a new application (or revision to an existing application). So, the present inventors are disclosing herein certain improvements to the arrangement 100 of components to provide an API browsing, exploring and using a conversational model with the developer.

Conversation is the natural form of exploring any domain, and the present inventors have determined that exploring the domain of available APIs shouldn't be the exception. Self-documenting APIs 102, such as Swagger and Open API APIs, expose certain application APIs details 103 that provide everything a developer needs to know to consume each offered operation, including, but not limited to, Summary, Description, Expected Input, Expected Output, etc.

These self-documenting APIs follow a standard to describe these Application API details in the Swagger and OpenAPI published documents. These are the details the developer needs after he or she has explored, browsed and selected an available application service. However, browsing these limited details are not conducive to exploring, comparing, evaluating and selecting from available services and APIs quickly and efficiently.

Intent-based RESTful APIs allow for a developer to explore, compare, evaluate and select from available services and APIs quickly and efficiently based on the intent of the needed operation by the developer. "Intent", as used in this vernacular, refers to a much more abstract or less detailed description of what the application service's offers for operations, without the clutter of the details of the actual API it implements. An "intent" for an application service is typically stated in a much higher-level natural language format that its API details, typically without any or many of the API technical details such as the exact requirements of the command/query interface. An intent may be something as easily read in natural language such as "find available airline routes between two cities within a time range", rather than EQ. 1:

[command=find_routes;start=date-time;end=date-time; max_cost=off;excluded_carriers=off; avoid_routes=off; max_returns=N; return=routes1:N]    EQ. 1

Having automatically generated and inferred this higher-level descriptive information which encapsulates the exposed or published API details, embodiments of the present invention provide a conversation-based API browsing and exploring functionality to the tool 110, thereby improving the performance of the tool itself, and, ultimately, improving the performance of the entire arrangement 100 to reduce developer time, computer communications bandwidth, computer processing bandwidth, release cycle 112 times and resources, and accuracy of consuming the most appropriate available application services 101 for new and revised application programs. Still further, embodiments of the present invention allow the developer to consume newer application services which explicitly provide intent-based APIs, as well as older pre-existing application services which are not intent-based without requiring the older application services to be re-designed to extend their API documentation to include intent-based information.

The improvements according to the present invention to the arrangement 100 such as the one illustrated in FIG. 1, engage available machine-learning-based natural language services 114 to leverage the available API details 103 to infer and generate 113 likely intents, entities, and dialog flows 103" to allow the developer to use the existing API browsing tools 110 to not only search for APIs using the traditional methods based on typical API details 103, but also to search based on natural-language intents, which form an improved set of API descriptors 103'. The inferencing generator 113 can be realized as a separate, specially-programmed server computer which is networked to the other computer systems 101, 110, or, it can be realized as an improved developer's computing platform 110 which also runs the self-documenting API browser or editor tool.

In a first set of improvements to computing technology, the computer resources of the development environment 150 are improved by using them more efficiently and more quickly. Armed with this high-level, natural-language information, the developer can browse and explore the great plurality of available application services 101 without having to cognitively consider all the details, but while also getting a first impression of the dialog flow(s) which may impact the final performance, whereas some dialog flows are lighter weight than others, and some dialog flows provide for more flexibility and granularity in operation performance. As such, the developer's time using the resources of the development environment 150 is reduced and minimized, while simultaneously creating a new application 111 which consumes the most efficient (lightest weight) data-interchange format, dialog and API(s) to perform the needed operations.

In a second set of improvements to computing technology, the computer resources of the runtime environment 160, including the computing bandwidth and data storage requirement of the target client device(s) 170 and of the stateless server platform(s) 190, are minimized by the engagement of the lightest weight data-interchange and APIs 181 used during runtime. By browsing a greater number of available API's during development, the developer is enabled to consider more options for the available application services 101, and to select the application services which fit the best with the new application's operations needs with the least amount of overhead, waste, and complexity, all within the development cycle time allowed by the release cycle 112 objectives.

In this manner, re-usable code which has evolved into over-used code is reduced to right-sized re-used code, which improves response times and resource consumption during development and after deployment.

Consider two hypothetical examples of the basic API details provided by two similar self-documenting APIs, both of which provide an operation to create a list of books:
API #1:
Method: GET
Summary: "List Books"
Description: "Returns the books in my library"
Parameters: none Path: /books
API #2:
Method: GET
Summary: "List Book"
Description: "Returns a book by id"
Parameters: bookId
Path: /books/{bookId}

This is a simplified example, so one might draw a conclusion that the summary of "list books" or "list book" is equivalent to an "intent". However, in practice, the summaries provided with real APIs are generally not so brief and simple. This basic API detail information can be used, by embodiments of the present invention, to generate various intents that enable the exploration by a developer using an improved development tool of the API set and action triggers that call the API, wherein the improved development tool provides a conversational user interface to the developer.

The following methods for API are examples of realizations according to the present invention. In a first example, a machine-learning natural language processor can be engaged to infer an "intent" based on the provided "summary" information of a plurality of similar self-documenting APIs. In a second example, a machine-learning natural language processor can be engaged to infer an "intent" based on the provided other details, such as "method", "path", and "parameters", provided by a plurality of similar self-documenting APIs. In a third example shown below, new "entities" can be generated based on models described in the self-documenting API, such as in a Swagger document:

1. Generate "intent" generation based on API Summary. This method takes into account the summary provided and expands the action verbs to include additional variations in the example set. For example: When an API is described as "Returns books", the example set is expanded to include variations of the action "Returns":
   "Return books"
   "List books"
   "Show books"
   "Display books"
   "See books"
2. Generate "intent" based on Method, Path, and Parameters of the API (operation). Because APIs expose create/read/update/delete ("CRUD") operations, "intents" and examples can be constructed in a similar fashion based on the following conventions:
   GET—used for "List, Returns, Show, Display, Get, See, Find" operations
   POST—used for "Create, Add, Generate" operations
   PUT—used for "Update, Change" operations
   DELETE—used for "Delete(s), Remove(s), Drop(s), Erase(s)" operations
3. Entity generation based on models described in the Swagger document.

Figure 2:
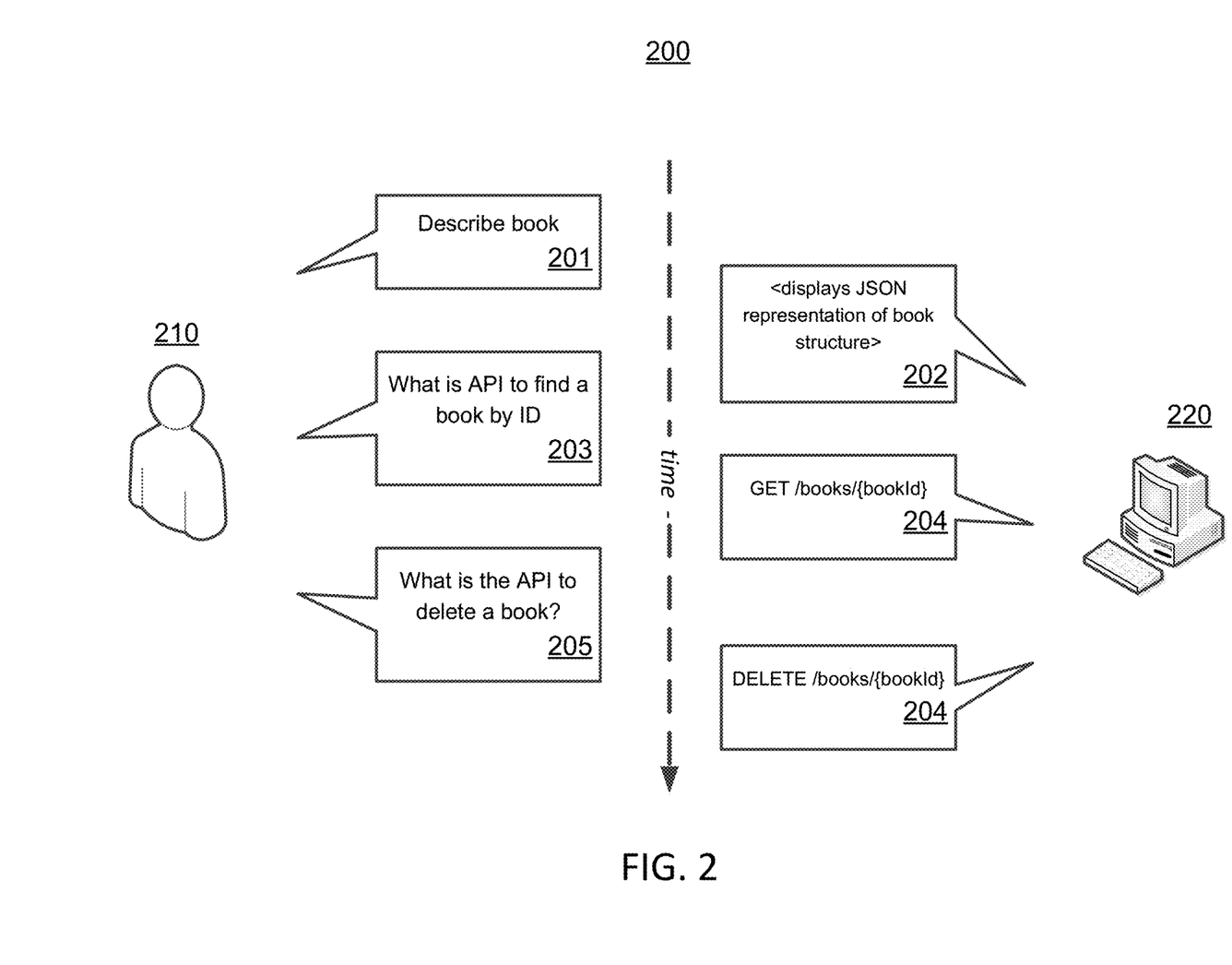
FIG. 2 shows an exemplary conversation-style user interface (UI) according to at least one embodiment of the present invention is shown.

Example Conversational User Interface. Referring now to FIG. 2, an exemplary conversation-style user interface (UI) according to at least one embodiment of the present invention is shown. This UI between an application developer 210 (i.e., the user) and an improved browser or editor system 220 for self-documenting API method discovery resembles, to the user, a chatbot-style of interface. In this example, the developer begins the conversation by entering a question about what APIs are available regarding operations to books 201. The improved editor or browser responds 202 with a display of the structure, such as a JSON representation, of CRUD operations on books. The user may then, knowing that some APIs are available, input an intent-based query, such as how to find a book by its ID value 203. The improved editor or browser responds 204 with a specific API example to find a book by its ID value. Or, the user may input an intent-based query regarding how to delete a book 205, and the improved editor or browser may respond 206 with a specific API example to delete a book, by its ID value. Note that in the third query-response (delete a book), the improved editor or browser presumes the user is going to use the book's ID value, and not some other criteria, which is a detail the user did not need to know to get an answer to the query. This is an example of how the user can query at a higher level based on intent than with the traditional search or query which is based on specific API details.

Figure 3:
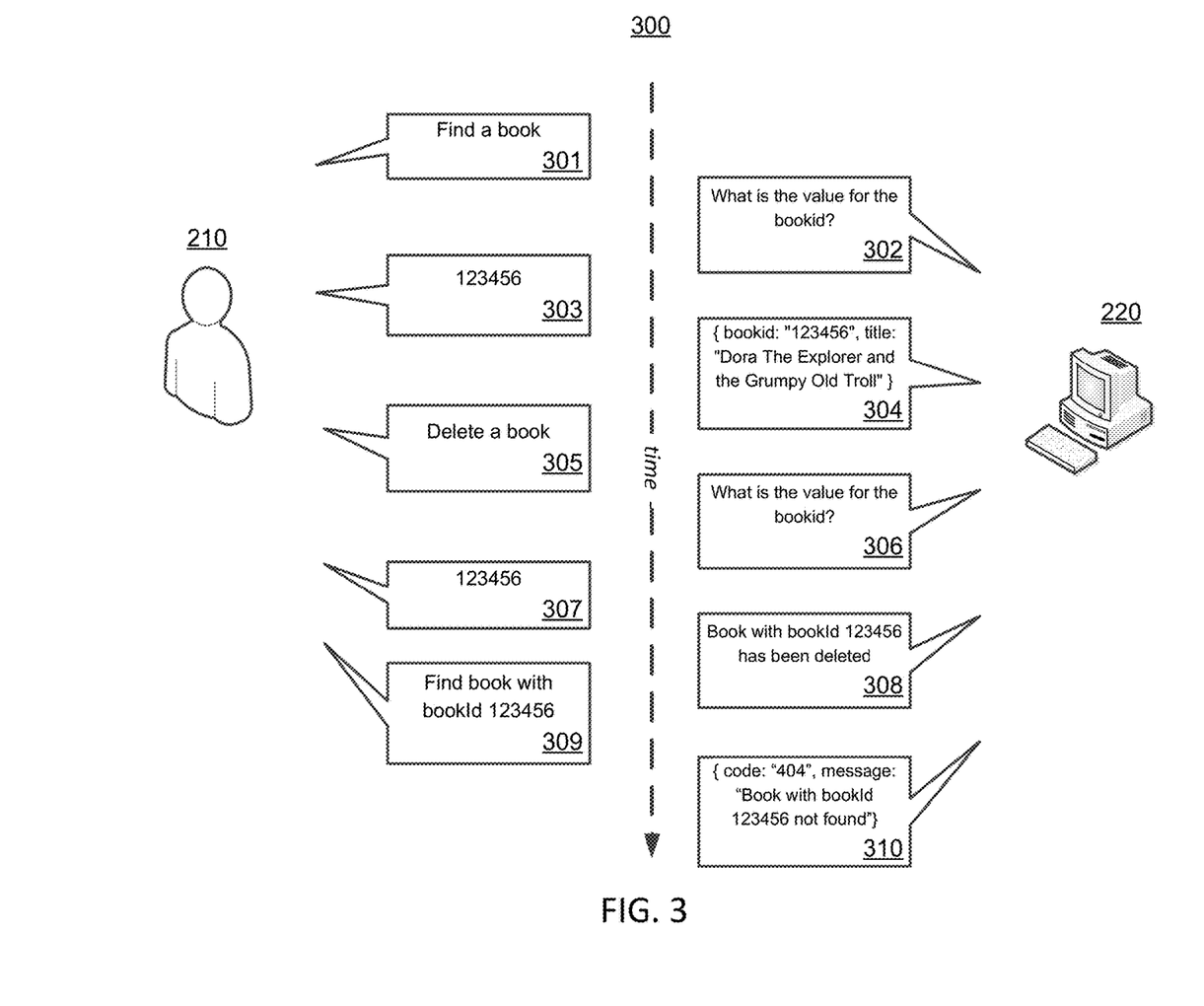
FIG. 3 shows another example of a conversational dialog.

Turning to FIG. 3, another example conversational dialog 300-310, similar to the one presented in FIG. 2, is shown in which the user 210 discovers how to find a book, then to delete a book, including the system 220 prompting 306 the user for a missing API parameter, and the user verifying 309 that the book was deleted.

Figure 4:
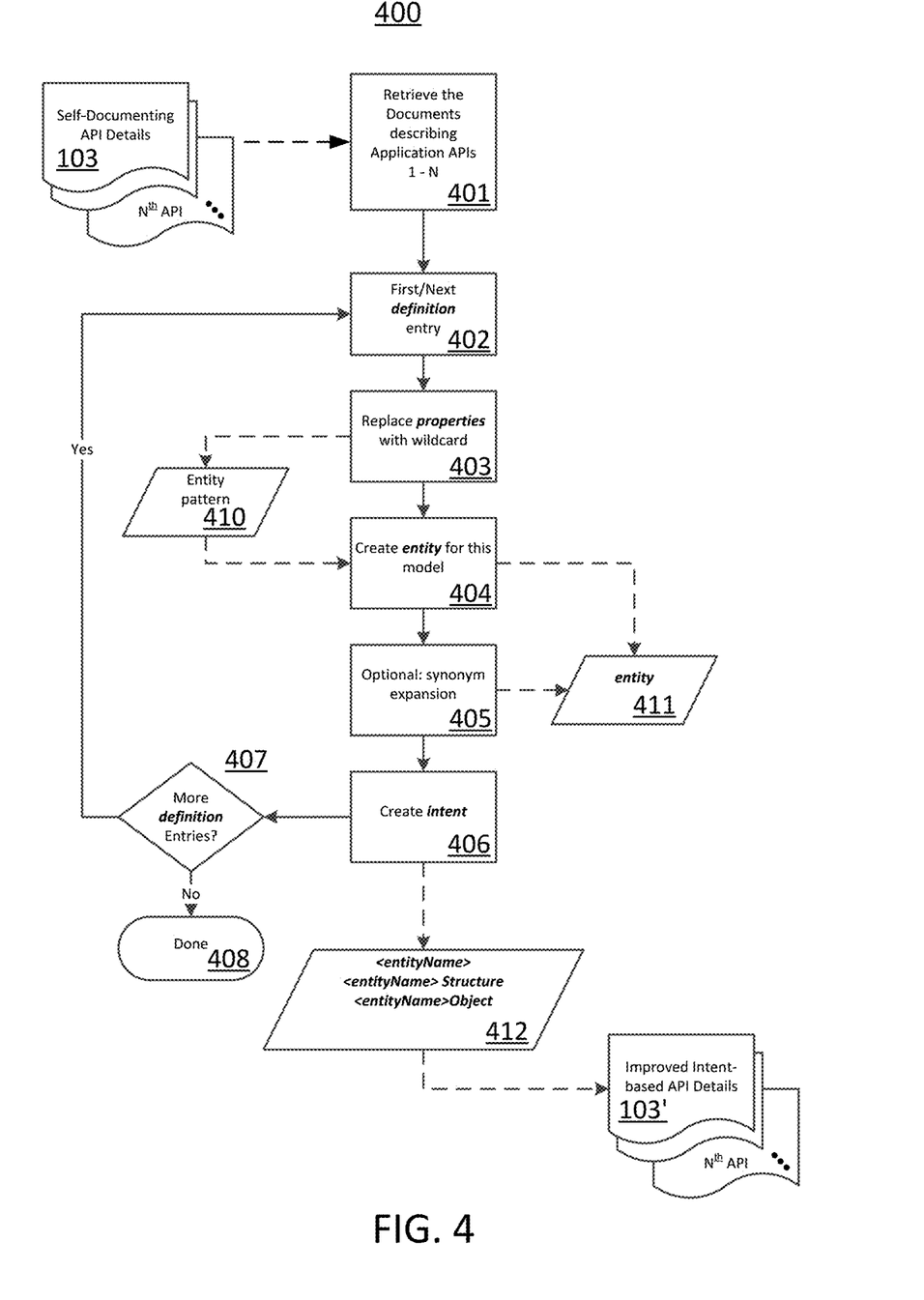
FIG. 4 sets forth an exemplary logical flow according to the present invention is shown.
Figure 5:
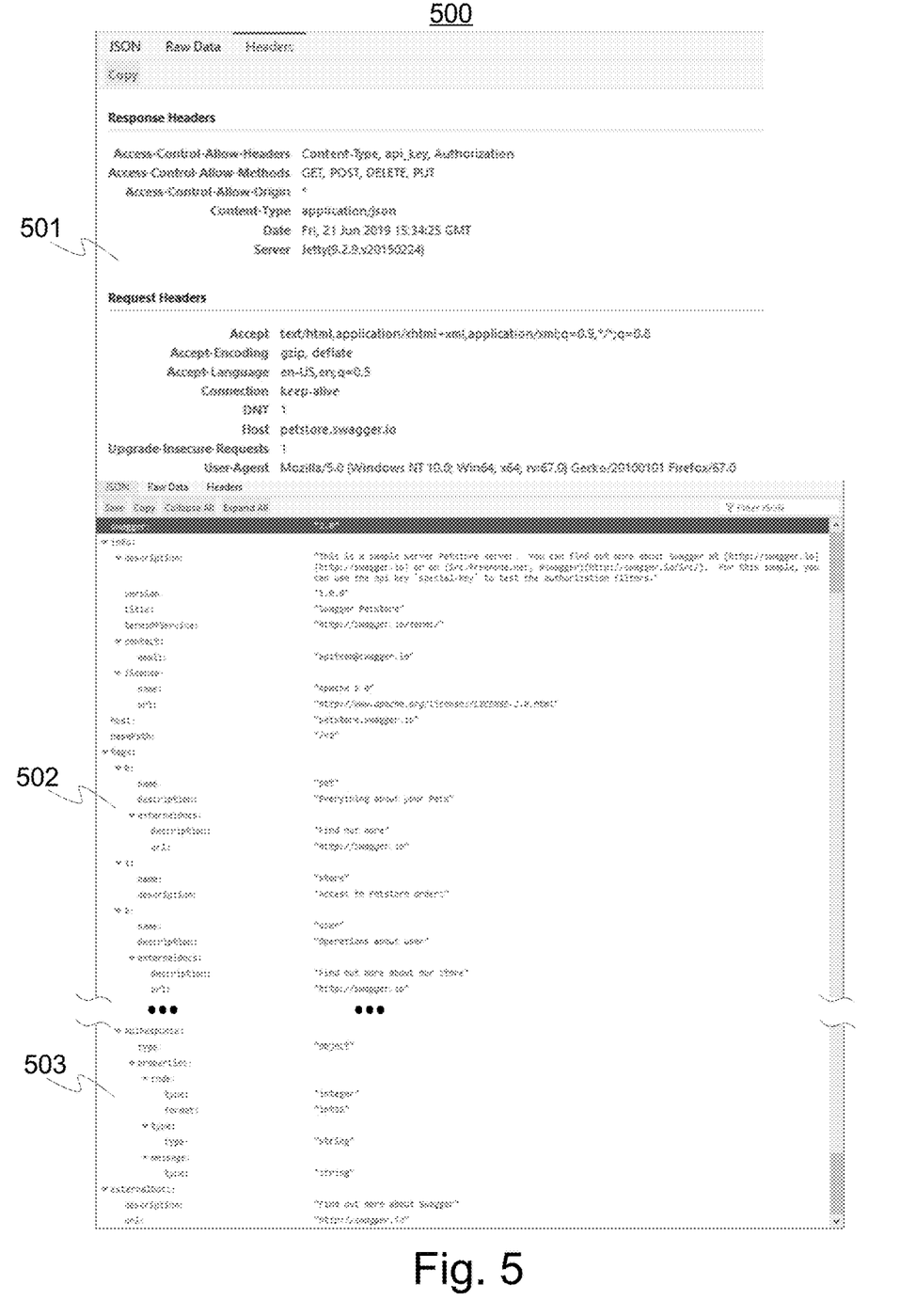
FIG. 5 is a partial reproduction of a publicly-available example Swagger JSON document for use in at least one example operation disclosure.

Now referring to FIG. 4, an exemplary logical flow 400 according to the present invention is shown. Each of the self-documenting API documents 103 for available first through $N^{th}$ APIs are retrieved 401, such as Swagger JSON Documents describing the Application APIs. FIG. 5 is a partial reproduction of such a Swagger JSON document 500 as provide by the Swagger organization for an example pet store application. It is shown in a JSON browser user interface using Mozilla Firefox™ browser, with the Headers tab 501, a beginning portion 502 of the JSON and an ending portion 503 of the JSON. In the document portions, several "description" entries and be seen, such as, under "tags:", a description of "Everything about your pets", etc.

Referring to FIG. 4 again, "entities" 411 are created by iterating 402-407 through all the different "definition" entries in the retrieved API Document(s). "Definitions" describe input/output models used throughout the different APIs. For each "definition", this exemplary embodiment retrieves the value of the properties attribute and replaces 403 every value with a regex wildcard .*. The resulting JSON will be the "entity pattern" 410. Next, continuing for each "definition", an "entity" 411 is created 404 for this model using the "entity pattern" 410. Optionally, synonym expansion 405 can be employed to assign additional variations of the current "entity" 411. For example, "dog" and "cat" can also be used to refer to a @Pet "entity".

Figure 6:
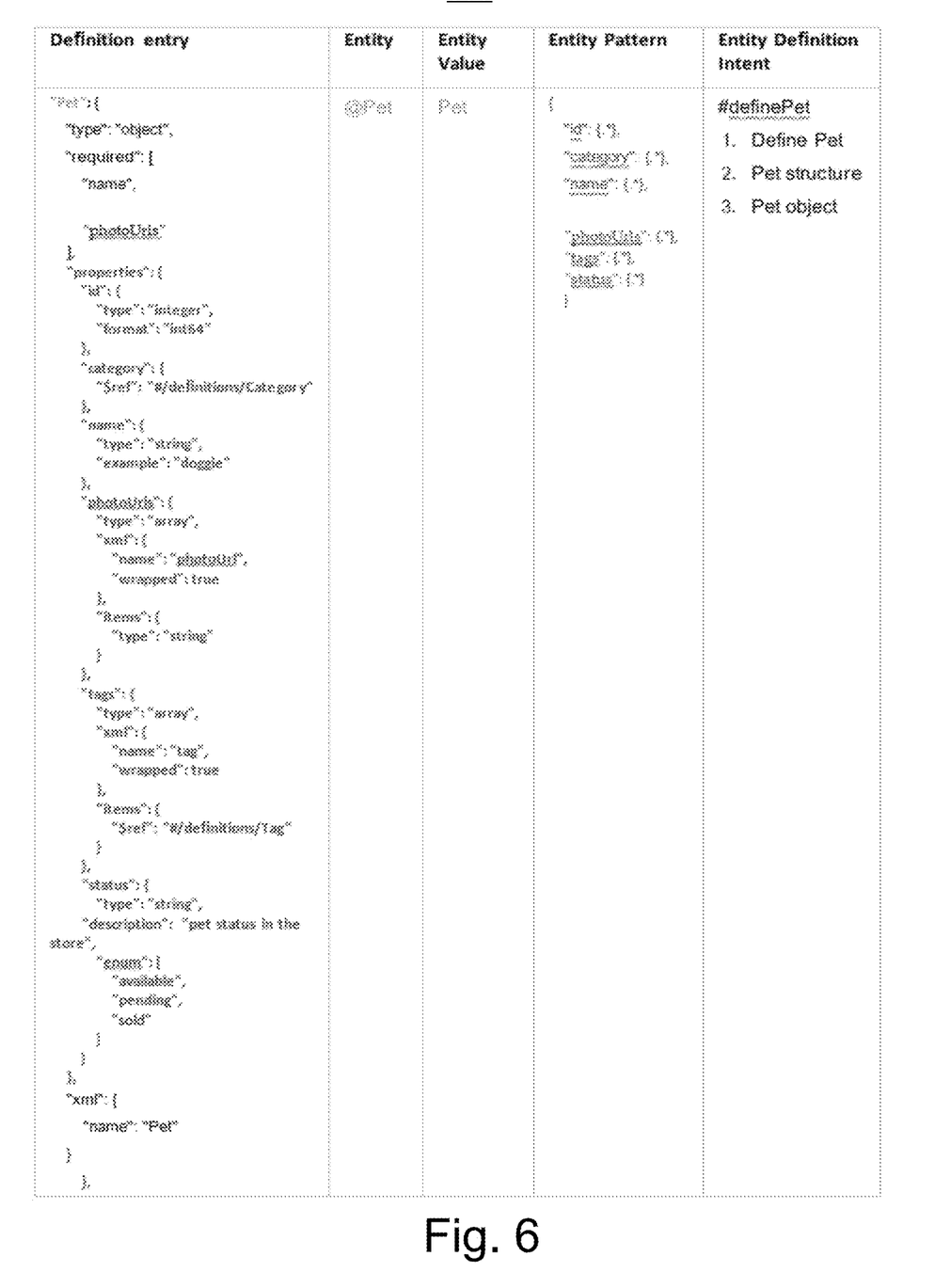
FIG. 6 illustrates created one or more "entities", entity values, and "entity patterns" according to at least one embodiment of the present invention.

Continuing for each definition, an "intent" 412 is created 406 for "entity" 411 definition, for example, #definePet with the following examples: Define <entityName>; <entityName> Structure; and <entityName> Object 412. This information is this associated with the original API details 103, to yield the improved intent-based API details 103', which enable an improved browser or editor to provide a user with the ability to peruse and select available APIs according to a high-level of intent expressed in a natural language. This iteration of steps 402-407 is continued until no more definitions are found in the API document(s) 103 to be processed, at which time the exemplary logical process is complete 408. FIG. 6 illustrates 600 "definition" entries found in an API description document, an "entity" created with its "value", an "entity pattern" created, and the inferred "intent".

Figure 7:
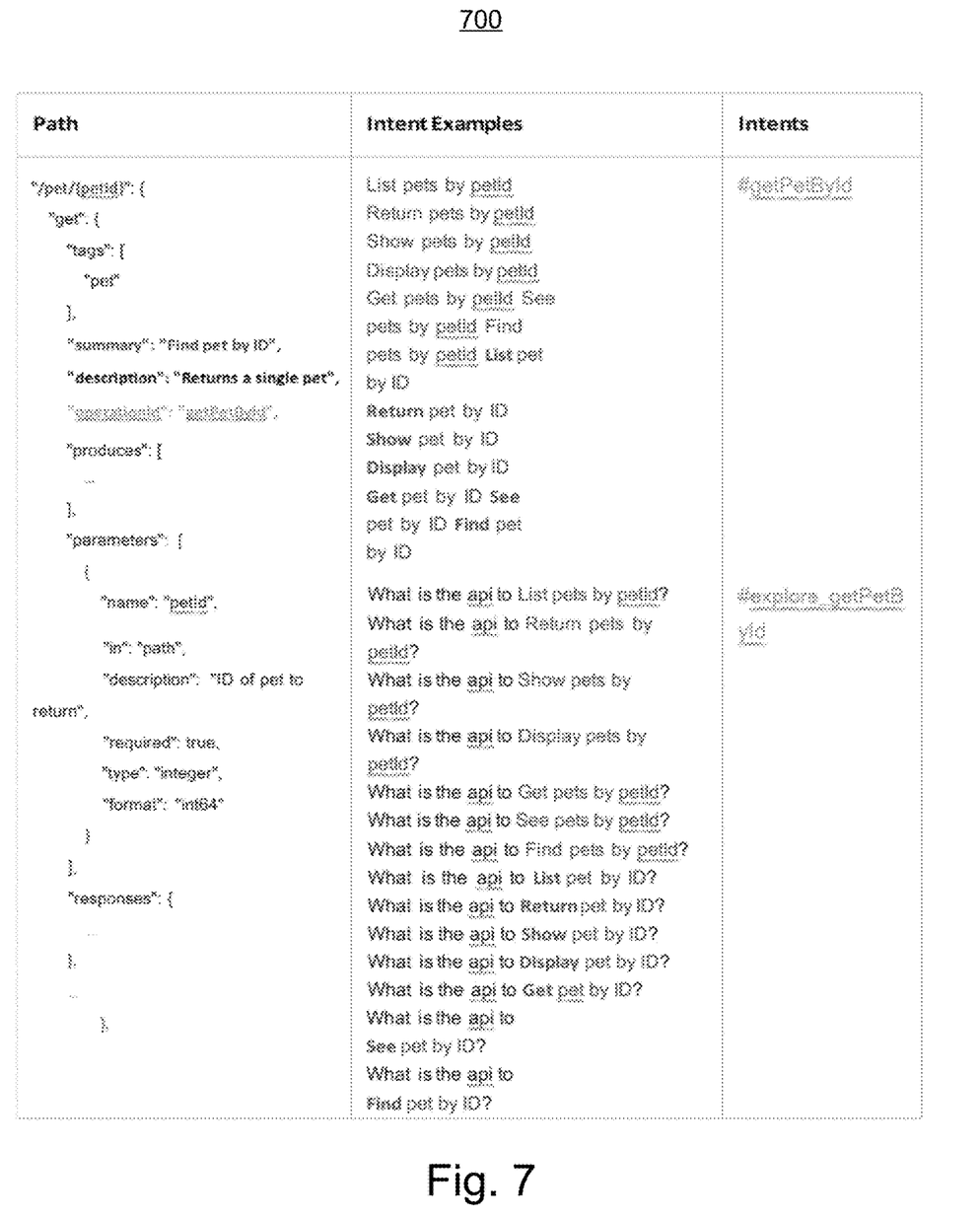
FIG. 7 illustrates one or more inferred "intents" derived from the elements of exemplary elements of FIG. 6.

In at least one embodiment, when a process according to the present invention is creating the "intents", it iterates through all the different "path" entries found in the Swagger JSON Document, such that, for each "path":
   a. the "operationId" value is retrieved, which is assigned to the "intent" name for this operation;

b. the operation details and process are retrieved to generate "intent" examples; and c. an "intent" with name from step 3a and examples from step 3b is created, as illustrated 700 in FIG. 7.

Figure 8:
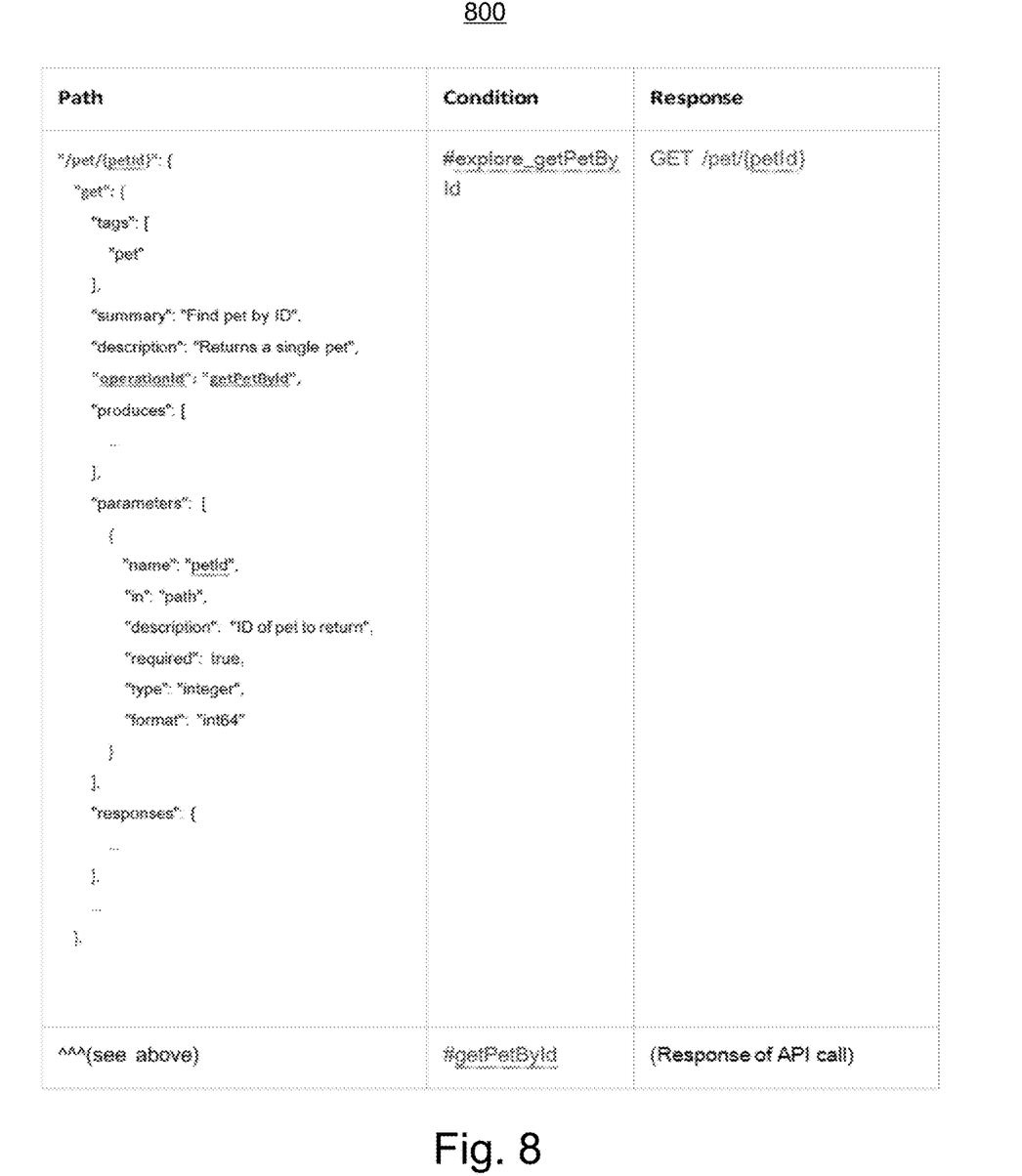
FIG. 8 illustrates dialog nodes as created by at least one embodiment of the present invention.

To create a data-interchange dialog to be associated with the intent-based API, one particular embodiment of a method according to the present invention iterates through the different "path" entries once again to build the dialog nodes, such as, for each "path", as illustrated 800 in FIG. 8:

a. Create Exploring APIs dialog nodes:
  i. Provide the matching explore "intent" name as the condition; and
  ii. Provide the current "path" as the response;
b. Create Calling APIs dialog nodes:
  i. Provide the matching "intent" name as the condition;
  ii. Create slots that represent the input data, if applicable; and
  iii. Create actions and/or generate code that define how the API is called.

To explore entities, a method according to at least one embodiment of the invention iterates through the different "definition" entries once again to build the dialog nodes, such as, for each definition:

a. Provide the matching definition name as the condition, i.e. #definePet; and
b. Provide the JSON representation of the "model" as the "response".

Figure 9:
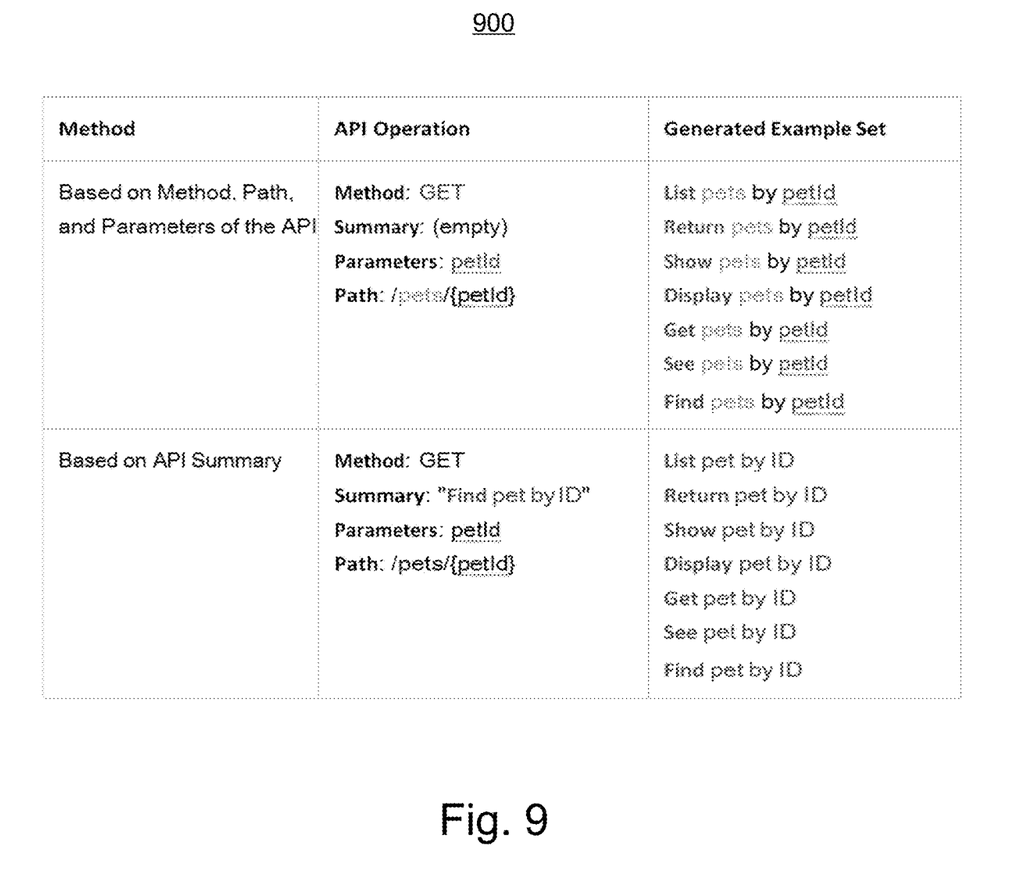
FIG. 9 shows an example method to generate missing variations using imperative sentences.
Figure 10:
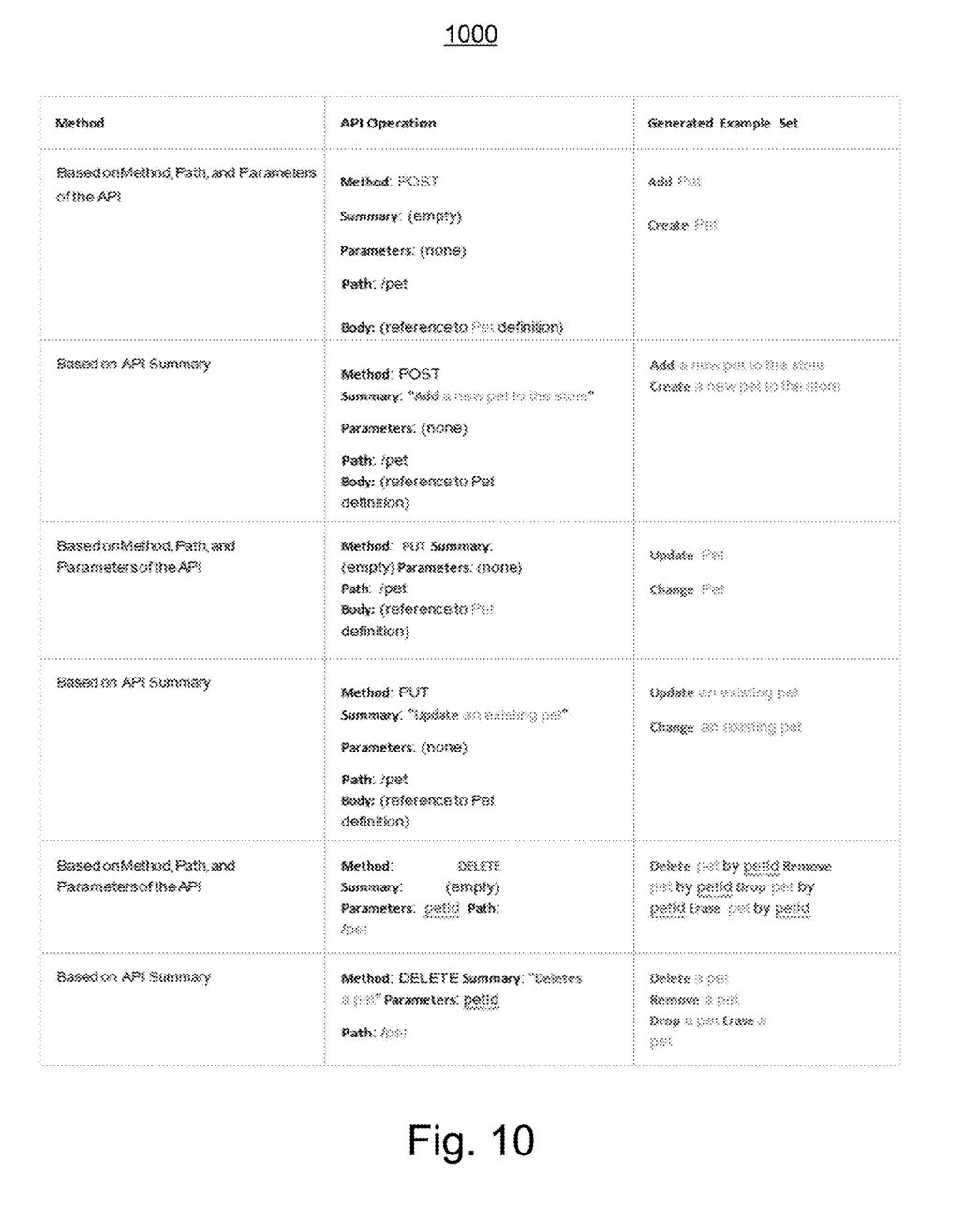
FIG. 10 depicts example intent generation for POST/PUT/DELETE-type operations.
Figure 11:
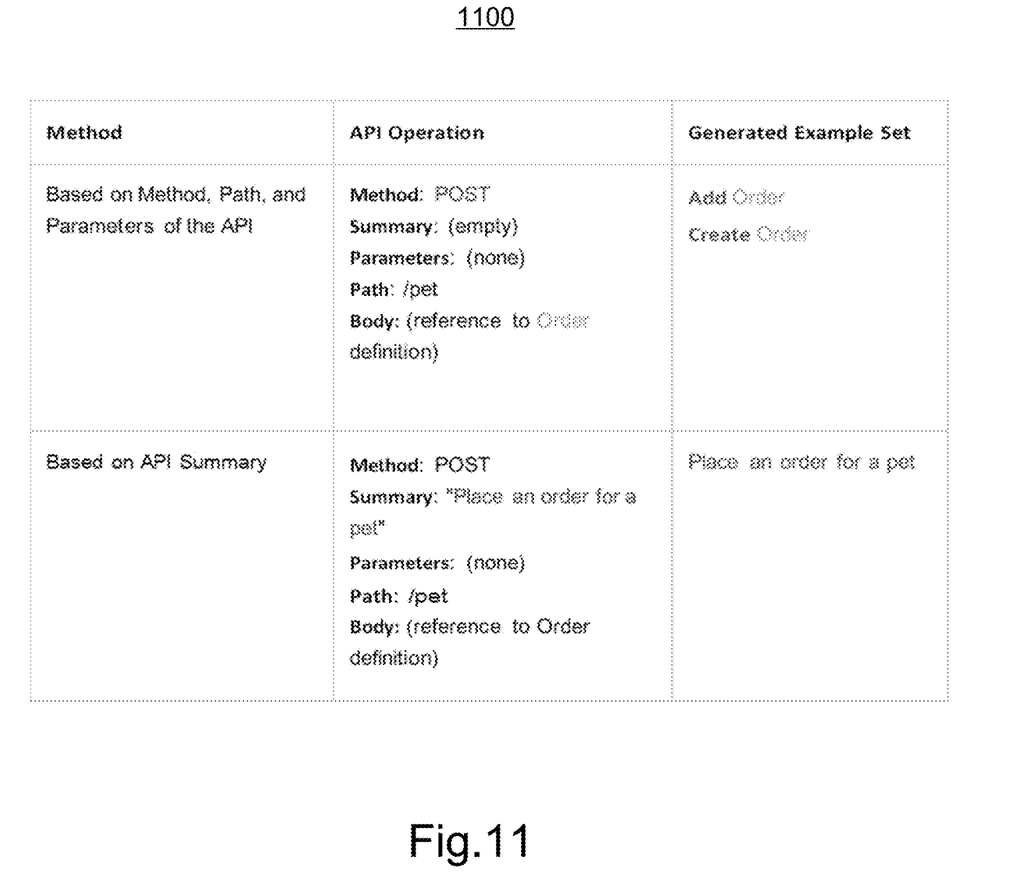
FIG. 11 depicts handling of "summary" entries which do not meet the add/find/update/delete pattern.

In a method according to at least one embodiment of the invention, if a self-documenting API has a "summary" which contains one or more of "List", "Returns", "Show", "Display", "Get", "See", "Find", then the method generates the missing summary variations using imperative sentences, such as the examples 900 provided in FIG. 9. Similarly, intents are generated for the remaining POST/PUT/DELETE-type operations, as illustrated 1000 in FIG. 10. Summary entries which do not meet the add/find/update/delete pattern may be added to the example set as-is, such as shown 1100 in FIG. 11. Still further, in other embodiments according to the invention, error codes can be ingested and processed in a similar manner in order to extend the conversation capabilities to include queries and answers regarding errors that might be returned by APIs, or what operations return specific errors, etc.

Computer Program Product Embodiments. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for intent-based exploring a self-documenting Application Programming Interface ("API") document, the method comprising:
   receiving, by a computer, a document containing a plurality of descriptions of APIs, wherein the document is in a structured format;
   generating, by the computer, a plurality of entities, wherein each entity of the plurality of entities is associated with an API definition entry of the plurality of API definition entries in the document and wherein each entity of the plurality of entities is generated by replacing the properties attribute of the API definition entry with a regex wildcard;
   generating, by the computer, a plurality of intents by iterating through the plurality of entities;
   generating, by the computer, a dialog by creating a plurality of phrases by iterating through the plurality of path entities in the document;
   receiving, by the computer, one or more questions from a user; and
   in response to the one or more questions, providing one or more conversational responses to the user by a conversational application program incorporating the plurality of entities, plurality of intents, and plurality of phrases;
   thereby improving efficiency of a user interface for a software developer tool to find suitable APIs, and improving efficiency of a runtime computing environment by improving the selection of APIs which consume minimal appropriate computing and communications resources.

2. The method as set forth in claim 1 wherein the generating of a plurality of intents by iterating through a plurality of path entries in the document comprises, for each path:
   retrieving operation ID values;
   retrieving operation details to generate intent examples; and
   creating an intent from the operation ID values and the generated intent examples.

3. The method as set forth in claim 1 wherein the generating of a dialog by creating a plurality of phrases by iterating through the plurality of path entries in the document comprises, for each path:
   creating exploring API dialog nodes, and
   creating calling API dialog nodes.

4. The method as set forth in claim 1 wherein the self-documenting Application Programming Interface ("API") document comprises a document selected from the group consisting of a Swagger-compliant document and an OpenAPI-compliant document.

5. The method as set forth in claim 1 wherein the self-documenting Application Programming Interface ("API") document comprises a REpresentational State Transfer (RESTful) application programming interface description document.

6. The method as set forth in claim 1, wherein the regex wildcard is a synonym.

\* \* \* \* \*